Patented July 20, 1943

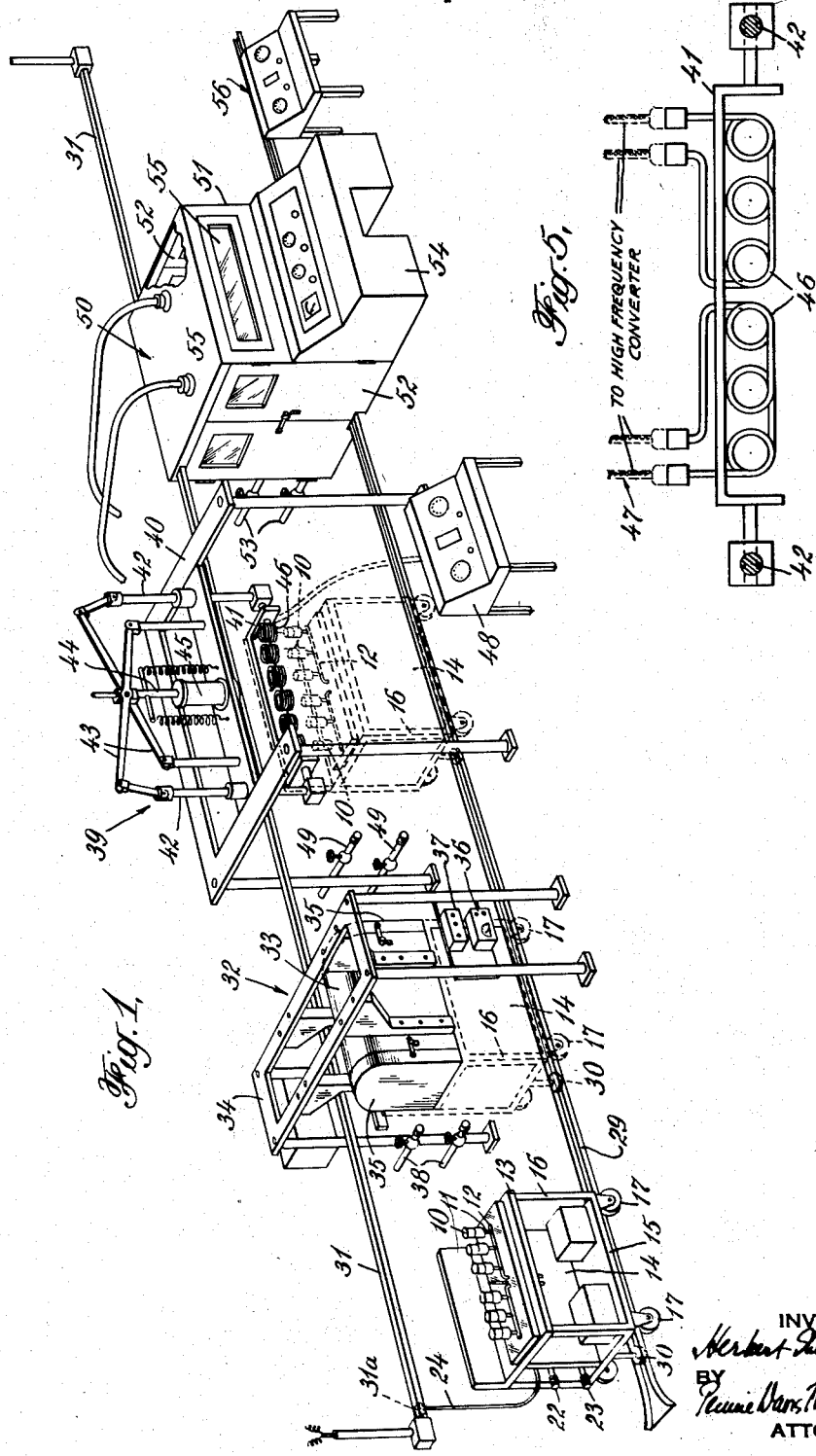

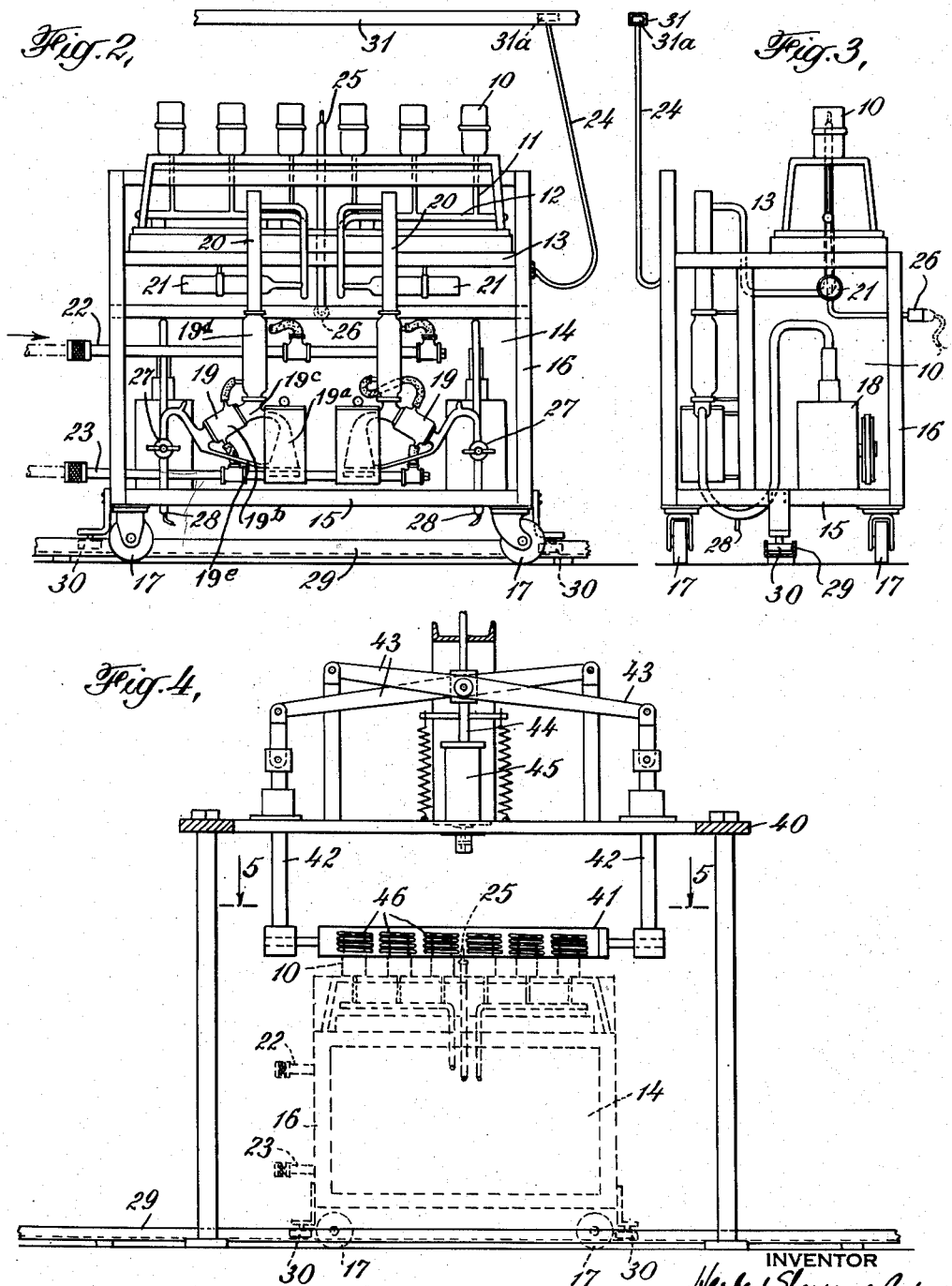

2,324,559

UNITED STATES PATENT OFFICE 2,324,559

MANUFACTURE OF VACUUM APPARATUS

Herbert Sherwood Cooke, Stamford, Conn., assignor to Machlett Laboratories Incorporated, Springdale, Conn., a corporation of Connecticut Application April 5, 1943, Serial No. 481,813

9 Claims. (Cl. 250—27.5)

This invention relates to the manufacture of vacuum tubes, such as rectifier or valve, X-ray, and other electron tubes, and is concerned more particularly with a novel method and apparatus by the use of which such tubes may be made more efficiently and rapidly than heretofore. The new method and apparatus may be employed advantageously in the production of vacuum tubes of various types, but, for purposes of explanation, the application of the principles of the invention to the manufacture of rectifier tubes will be described in detail. It will be apparent, however, that the utility of the invention is not limited to the production of electron tubes of that particular variety, although minor modifications may be conveniently adopted to obtain best results in producing tubes of other kinds.

In the production of rectifier tubes as now carried on, the anode and cathode parts are first made and assembled, and the assemblies sealed in an envelope, usually of glass, in which a rough vacuum is drawn. The tubes are then ready for the subsequent process in which the occluded gases are removed from the interior surfaces of the envelope and from the surfaces of the metal parts within the envelope and the high vacuum is established. The tubes are, accordingly, transported to an oven with which is permanently associated a vacuum pumping system having a tubulation extending into the oven chamber. The system usually includes a motor driven fore pump, a diffusion pump, a carbon trap, etc.

At the oven, the tubes are connected in a group to the tabulation by a glass blowing operation, the pumping system is started, and energy is supplied to the oven heating units. As the tubes are baked, the gases inside them and also the occluded gases evolved by the baking operation are drawn off by the pumping system. After the baking has continued for some time, such as an hour and a half, the heating is discontinued and the oven opened. As soon as the oven has cooled somewhat, the metal parts of the tubes are subjected to heat by the action of high frequency fields, and, for this purpose, coils are placed about the individual tubes and high frequency current is supplied to the coils. The high frequency fields so generated produce eddy currents in the metal parts within tubes and such currents heat the parts to high temperature with consequent evolution of occluded gases which are drawn off by the pumping equipment.

Following the high frequency heating, the tubes are supplied with energy to cause the filaments to be heated and the anodes to be bombarded with electron streams. For this purpose, the tubes are connected to high voltage and filament current supply lines and the tubes are operated while the pumping continues. After the electrical treatment is completed, the tubes are sealed off the pumping system and are then ready for final test.

The manufacture of vacuum tubes by the procedure above described has numerous disadvantages. Thus, the operative performing the work must be highly trained in a number of fields. He must be skilled in glass blowing, in order that he may successfully connect the tubes to the pump tubulation and seal off the pumped tubes. Also, in the high frequency heating, considerable judgment is required to carry on the operation properly and likewise the electrical treatment can only be carried on by a trained workman. Another disadvantage lies in the fact that the equipment is not used with maximum efficiency. The tubes remain in the oven throughout the baking and the high frequency and electrical treatments, and each oven is provided with high voltage connections and frequently with its own high frequency equipment, although in some instances, the high frequency equipment is portable and may be used at more than one oven. However, in any prior arrangement, the oven is used as such only during baking and it is then allowed to cool down and is out of use during the succeeding operations. Similarly, the high frequency and high voltage apparatus are used only a part of the time and their periods of idleness represent a considerable loss, as their cost is high.

The present invention is, accordingly, directed to the provision of a novel method and apparatus for the production of vacuum tubes which avoid the disadvantages above pointed out and can be utilized with greater efficiency than prior methods and equipment. In addition, the practice of the invention does not require operatives, each of whom is possessed of a variety of skills, in that each operative carries on only a limited number of operations, instead of all.

The new apparatus includes a plurality of stations arranged in series and transfer trucks or dollies movable to the successive stations. Each dolly carries one and preferably two, complete pumping systems, each including a fore pump, a diffusion pump, a carbon trap, etc., and such system is provided with a tubulation by which a plurality of tubes to be treated can be connected thereto. The dolly moves along a track from one station to the next and, throughout its travel along the track, current is supplied to it so that the tubes are being evacuated at all times. At the several stations, the tubes are baked and given the high frequency and electrical treatments and, while the equipment at one station is in use for one operation, tubes may be given other treatments at the other stations. When the tubes on a dolly have been completed, they are sealed off the pumping equipment thereon, and the dolly is then ready for the next batch of tubes.

For a better understanding of the invention, reference may be made to the accompanying drawings, in which Fig. 1 is a view in perspective of one form of apparatus for use in practicing the new method;

Fig. 2 is a view in rear elevation of a transfer truck or dolly forming part of the apparatus;

Fig. 3 is a view similar to Fig. 2 but at right angles thereto;

Fig. 4 is a view in front elevation of the high frequency heating equipment at one station; and Fig. 5 is a sectional view on the line 5—5 of Fig. 4.

In practicing the new method by the apparatus described, a plurality of tubes 10 are first sealed to tubulations 11 which are connected to manifolds 12 mounted on the top 13 of a transfer truck or dolly 14. Such a dolly includes a base 15 from which extend uprights 16 supporting the top 13, and the dolly is provided with rollers 17 so that it can be readily moved over the floor.

The dolly carries one or more pumping systems and, in the apparatus illustrated, each dolly has two systems provided with separate manifolds 12. Each system includes a motor driven fore pump 18, a diffusion pump generally designated 19, a carbon trap 20, and an ionization gauge 21 sealed to the manifold 12.

The fore pump, which operates in series with the diffusion pump, may be of any of the usual types and may, for example, include a casing containing an eccentric rotor against which bears a spring-pressed vane. Such a fore pump provides a means for rapidly drawing a fair vacuum.

The diffusion pump may be of the molecular jet type and may include an evaporating vessel 19$^a$ heated by an electric coil and containing a low vapor pressure fluid. The vessel has an outlet tube provided with a number of nozzles discharging into the water-jacketed chamber 19$^b$, which is connected to the intake of the fore pump 18. The outlet tube from vessel 19$^a$ extends through a chamber 19$^c$ connected to the interior of chamber 19$^b$ and also connected by a column 19$^d$ containing baffles to the activated carbon trap 20, which is connected to the manifold 12. The column 19$^d$ is water-jacketed and the water space is connected to that of chamber 19$^b$. Fluid condensed in chamber 19$^b$ returns to vessel 19$^a$ through line 19$^e$. Pumps of this type are well-known and when such a pump is employed in series with a fore pump, the system is capable of producing a high vacuum of the order of $5 \times 10^{-7}$ m. m. of mercury.

In the operation of such a pumping system the vapors from the low pressure fluid, such as oil, which are evolved by heating the oil in vessel 19$^a$, flow through the outlet nozzles from the vessel and become mingled with the low pressure gas in chamber 19$^b$ immediately in front of the nozzle orifices. The vapor of the oil is condensed in chamber 19$^b$ and returns through line 19$^e$ to the vessel while the low pressure gas which has been entrained by the vapor is drawn out of chamber 19$^b$ by the fore pump. Any traces of oil vapor which enter the column 19$^d$ are prevented by the baffles and the carbon trap from entering the manifold 12.

The ionization gauge is of conventional type and requires no further explanation.

Cold water for cooling the chambers 19$^b$ and columns 19$^d$ of the pumping systems is supplied through connections 22, 23 mounted on the dolly and provided with couplings at their ends. Power is supplied through cable 24 to the fore pump motors and the heating elements for the diffusion pumps and traps. For control purposes, a thermocouple 25 is mounted on the dolly and is provided with a quick detachable connector 26 by which it can be connected to a pyrometer. A stop cock 27 in each pumping system permits the vacuum in its manifold to be broken, if occasion arises, and means are provided at 28 for removal of condensed oil vapors from each system.

The dolly is movable along a track 29 and, for this purpose, rollers 30 mounted on the base of the dolly run between flanges on the track as the dolly traverses the latter. Power is supplied to the cable 24, throughout the travel of the dolly along the track, by means of bus bars 31, extending the length of the track, and a traveling contact or trolley 31a movable along the bus bars and connected to the cable.

The tubes 10 to be sealed on the dolly are delivered to any convenient point after completion of the assembling operations and they are sealed to the tubulations on the dolly at that point, which may be remote from the track. The sealing on of the tubes is carried on by the usual glass blowing operations and, after it is completed, the dolly is started on the track, the cable is connected to the movable contact, and the dolly is advanced along the track to the first station, generally designated 32.

In the apparatus illustrated, station 32 is the baking station and it includes an oven 33 of suitable materials suspended from a framework 34 above the track and having an open bottom and movable doors 35 at its ends. The oven is provided with heating means, preferably in the form of electrical heating elements (not shown) with appropriate supply and control means. At the oven, there are control panels 36, 37 for the ionization gauges and for the pyrometer used for controlling oven temperature. Water connections 38 with appropriate flexible hose are provided at the station for supplying cold water to connections 22, 23.

The dolly is moved beneath the oven while the doors of the latter are open and when the dolly is in proper position, the doors are closed and the proper connections made. In that position of the dolly, the top of the latter, which is of heat-resistant material, closes the open bottom of the oven and protects the equipment on the dolly from the oven heat.

In the oven, the tubes, which are constantly being pumped, are heated for a considerable period, for example, an hour and a half, at such a temperature as will insure evolution of occluded gases from the interior surfaces thereof, and such gases are then evacuated by the pumping equipment. The duration and temperature of the heating will, of course, vary with different types of tubes and the period above mentioned is appropriate for one form of commercial tube.

At the completion of the heating, the rear door of the oven is opened, the connections are broken, and the dolly is advanced along the track to the next station, which is generally designated

39. Station 39, in the apparatus illustrated, is provided with high frequency equipment for heating the metal parts within the tubes, such as the electrodes, stems, etc. Station 39 comprises a framework 40 on which is mounted a support 41 carried by rods 42 connected by linkage 43 to the piston rod 44 of a piston in a cylinder 45. By introduction of fluid under pressure into the cylinder, the linkage may be operated to raise or lower support 41, as desired.

Support 41 carries a plurality of high frequency coils 46, one for each tube on the dolly, and these coils are in such arrangement that, when the dolly is in proper position at the station and centered by the track, support 41 may be lowered so that each coil encircles a tube. The coils are of conventional construction, being hollow and water cooled. In the construction shown for use with a dolly carrying six tubes, the coils may be arranged in two groups of three in series and connected by hollow lines 47 to a high frequency converter (not shown) of standard construction. A stand 48 at the station carries the instruments, etc., by which the apparatus at the station is controlled and water connections 49 are provided for the pumping equipment on the dolly.

At station 39, the heating by high frequency is continued for the same period as the baking and, upon its completion, the coils are deenergized and raised from around the tubes and the dolly is advanced along the track to the next station, generally designated 50.

At station 50, the tubes are given electrical treatments which may, for example, involve supplying current to the filaments and high voltage to the electrodes, so that the anodes are bombarded by electron streams and thereby outgassed. Under such conditions, certain types of tubes will generate X-rays against which the operator should be protected. The equipment at station 50, accordingly, includes a cabinet 51 covered with metallic lead and provided with doors 52 at its ends. The track 29 and the bus bars 31 extend through the cabinet and water connections 53 for the dolly pumping equipment enter the cabinet from the rear. Within the cabinet are high voltage and filament current supply leads and, after the dolly has been moved into the cabinet and the connections made, the doors are closed. A stand 54 in front of the cabinet carries instruments, etc., by which the operative can regulate the conditions under which the tubes are treated and the tubes undergoing treatment can be inspected through lead glass windows 55 in the front wall and doors of the cabinet.

When the electrical treatment at station 50 is completed, the dolly is moved along a track to any stations that may be required for further treatment. One such station is illustrated at 56 and at this station, the tubes may be given a special filament treatment. Such additional stations may or may not be required, depending on the type of tube being produced, although at such a station, the completed tubes may be sealed off at tubulations and delivered for final test. Ordinarily the sealing off operations will be carried on after the dolly has been moved off the end of the track.

The apparatus described is suitable for the treatment of certain tubes in which the baking, high frequency heating, and electrical treatments consume about the same length of time, so that while one dolly is at station 50 with its tubes undergoing electrical treatment, another may be at station 39 where the tubes are being subjected to high frequency heating, and still another dolly may be disposed at station 32 where its tubes are being baked. Still another dolly may be at the supply point where tubes are received from the assembling operation and are sealed on the dolly, and another dolly may be at a station where the sealing off operations are carried on.

The apparatus described, when used in the production of tubes which require treating operations of about the same duration, can thus be used to capacity at all times with the equipment at all stations functioning substantially continuously. With some tubes, the treatment at one station may take longer than that at another and, in that event, the station requiring the longer treatment may be duplicated, with the two similar stations disposed in parallel along the track, so that the dollies may be placed at one or the other of the two stations, as required.

In some instances, it may be desirable to carry on the pumping for some time prior to the baking, as, for example, with the pumps working and the traps of the pumping equipment undergoing heating. In that event, the dolly may be placed at the beginning of the track in advance of the oven, as illustrated in Fig. 1, and the pumping equipment may be operated for a period prior to the movement of the dolly to station 32. When the pumping is carried on with the dolly in advance of station 32, the cold water for the pumps will be supplied through flexible hose connections (not shown).

Aside from the advantage of operating the equipment at the various stations without substantial interruption that is afforded by the new apparatus, there are various other advantages. Thus, since the oven is continuously used to bake the tubes on one dolly after another, it is unnecessary to shut off the energy supply to the heating elements of the oven after each baking treatment. The oven, accordingly, remains at temperature and damage to the heating elements and to the oven walls resulting from cycles of heating and cooling are avoided. Also, since the oven continues heated at all times, the time required for baking the tubes is reduced. With present equipment, it is not possible to keep the oven hot continuously because the high frequency and electrical treatments are carried on in the oven and this would be impossible if the oven were maintained at temperature.

Another advantage afforded by the apparatus is that the operations carried on in the stations are supervised or performed by operatives who do not have to be possessed of a variety of skills. Thus, the sealing on and sealing off of the tubes may be done at one station by a workman performing no other operations. The baking may be controlled by a workman who need have no glass blowing skill. Supervision of the high frequency and electrical treatments requires operatives of considerable training in those fields, since they must rely on their judgment to an important degree in carrying on the operations properly, but, with the new apparatus, such operatives need not have other training. In the prior methods, it was the practice for one operative to perform a number of operations, such as the sealing on of the tubes, the baking, high frequency treatment, etc. As a result, the period of training for such an operative was long and not all operatives could be trained to perform all the operations with equal skill. In the new equipment, the division of labor is such that less training per operative is required and those who display skills in one operation but not in another, can still be used. As a result of such a division of labor, the individuals supervising the different operations can not only be trained in a relatively short time but also become highly proficient in their respective tasks with consequent improvement in efficiency in production.

I claim:

1. A method of manufacturing vacuum tubes which comprises connecting a plurality of tubes to a vacuum pump, operating the pump to evacuate the tubes, and, while the pump continues to operate, moving the tubes and pump successively to stations at which the tubes are baked, subjected to high frequency fields, and supplied with electrical energy to cause a flow of current therethrough.

2. A method of manufacturing vacuum tubes which comprises connecting a plurality of tubes to a vacuum pump, operating the pump to evacuate the tubes, and, while the pump continues to operate, moving the tubes and pump to a series of stations, and, at the successive stations, heating the tubes while the pump is not exposed to the heat, subjecting the tubes individually to high frequency fields, enclosing the tubes and pump within an insulating chamber, and supplying electrical energy to the tubes within the chamber to cause current to flow through the tubes.

3. A method of manufacturing vacuum tubes which comprises connecting a plurality of tubes to a vacuum pump, evacuating the tubes by operation of the pump and, while the tubes remain connected to the pump and the evacuation continues, moving the tube and pump assembly to stations in a series, and, at the successive stations, heating the tubes to a temperature at which occluded gases within the tubes are evolved to be drawn off by the pump, heating the metal parts within the tubes by high frequency fields to evolve occluded gases from such parts to be drawn off by the pump, and supplying electrical energy to the tubes to cause current to flow therethrough.

4. Apparatus for manufacturing vacuum tubes, which comprises a baking station, a high frequency station, and a power station arranged in series, a carriage movable to the stations one after the other, a power-operated vacuum pump system on the carriage, the pump system having a tubulation adapted for connection to vacuum tubes, means for centering the carriage at each station, and means for supplying power to the carriage on its way to and at the stations.

5. Apparatus for manufacturing vacuum tubes, which comprises a baking station, a high frequency station, and a power station arranged in series, a carriage movable to the stations one after the other, a power-operated vacuum pump system on the carriage, the pump system having a tubulation adapted for connection to vacuum tubes, the baking station being constructed to heat the tubulation and the tubes connected thereto and the high frequency station being equipped with means for subjecting the tubes to high frequency fields, means for centering the carriage at each station, and means for supplying power to the carriage on its way to and at the stations.

6. Apparatus for manufacturing vacuum tubes, which comprises a baking station, a high frequency station, and a power station arranged in series, a carriage movable to the stations one after the other, a power-operated vacuum pump system on the carriage, the pump system having a tubulation adapted for connection to vacuum tubes, the baking and high frequency stations being constructed to act on the tubes connected to the tubulation and the power station being constructed to enclose the carriage, means for centering the carriage at each station, and means for supplying power to the carriage on its way to and at the stations.

7. Apparatus for manufacturing vacuum tubes which comprises a track, stations spaced along the track for baking tubes, subjecting the tubes to high frequency fields, and operating the tubes, a carriage movable along the track, a power-operated vacuum pumping system on the carriage, and means including a tubulation adapted to have vacuum tubes connected thereto, and means for supplying power to said system throughout the movement of the carriage along the track and while it is at the stations.

8. In apparatus for manufacturing vacuum tubes, a movable carriage, a vacuum pumping system on the carriage provided with a tubulation adapted to have vacuum tubes connected to it, a track along which the carriage is movable, and means for supplying current to the pumping system throughout the traverse of the track by the carriage.

9. In apparatus for manufacturing vacuum tubes, a movable carriage, a power-operated vacuum pumping system including fore and diffusion pumps on the carriage, said means including a tubulation adapted to have vacuum tubes connected to it, a track along which the carriage is movable, and means for supplying current to the pumping system throughout the traverse of the track by the carriage.

H. SHERWOOD COOKE.